US008125447B2

(12) United States Patent
Ohshita et al.

(10) Patent No.: US 8,125,447 B2
(45) Date of Patent: Feb. 28, 2012

(54) COORDINATE INPUT DEVICE

(75) Inventors: Kazuhito Ohshita, Fukushima-ken (JP); Naoyuki Hatano, Fukushima-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 584 days.

(21) Appl. No.: 12/337,825

(22) Filed: Dec. 18, 2008

(65) Prior Publication Data

US 2009/0160766 A1 Jun. 25, 2009

(30) Foreign Application Priority Data

Dec. 25, 2007 (JP) ................................ 2007-332294

(51) Int. Cl.
*G06F 3/033* (2006.01)

(52) U.S. Cl. ........................................................ 345/157

(58) Field of Classification Search .................. 345/157, 345/145, 159, 160, 165, 161, 163, 167
See application file for complete search history.

(56) References Cited

U.S. PATENT DOCUMENTS 4,751,502 A * 6/1988 Ishii et al. ...................... 345/1.1
4,959,523 A * 9/1990 Fihey et al. .............. 219/124.34
5,940,063 A 8/1999 Komatsu
7,379,789 B2 * 5/2008 Takenaka et al. ............. 700/245
7,688,228 B2 * 3/2010 Tanizaki et al. .......... 340/995.12
7,854,655 B2 * 12/2010 Mao et al. ....................... 463/30
7,894,943 B2 * 2/2011 Sloup et al. ................... 700/276
2006/0247799 A1 * 11/2006 Takenaka et al. ............... 700/54
2007/0216521 A1 * 9/2007 Guensler et al. .............. 340/439
2009/0169357 A1 * 7/2009 Slack ............................. 415/26
2010/0304877 A1 * 12/2010 Iwahashi et al. .............. 473/223
2010/0321291 A1 * 12/2010 Kabasawa et al. ............ 345/157

* cited by examiner

*Primary Examiner* — Fred Tzeng
(74) *Attorney, Agent, or Firm* — Brinks Hofer Gilson & Lione

(57) ABSTRACT

A coordinate input device includes an operation unit that is provided so as to be operated, strain sensors that output data corresponding to an operation amount of the operation unit, and a control unit. The control unit performs the count corresponding to the increase or decrease of speed data that is obtained by converting data sequentially output from the strain sensors, and generates counted count values or coordinate data calculated from the count values. The control unit calculates a moving average value from the count values that are sequentially output every predetermined time. When the moving average value satisfies predetermined conditions, the control unit regards that the operation of the operation unit is cancelled, and stops the output of the coordinate data or outputs 0 as the count value.

2 Claims, 2 Drawing Sheets

COORDINATE INPUT DEVICE

CROSS REFERENCE TO RELATED APPLICATION

The present invention contains subject matter related to Japanese Patent Application No. 2007-332294 filed in the Japanese Patent Office on Dec. 25, 2007, the entire contents of which being incorporated herein by reference.

BACKGROUND

1. Technical Field

The present disclosure relates to a coordinate input device that has hysteresis characteristics with respect to a load, and more particularly, to a coordinate input device that improves operability by reducing the influence of residual noise.

2. Related Art

An input device, which can accurately stop a cursor at an intended position, is disclosed in Japanese Unexamined Patent Application Publication No. 10-21002. In this coordinate input device, corresponding count values are generated when load data output from sensors is increased, and decrease count values, which start a state where count values until that moment are decreased by half, are generated when the load data tend to be decreased. Accordingly, when a cursor is moved, it is possible to prevent the overrun of a cursor and to accurately stop a cursor at an intended position by performing an operation that is equivalent to substantially easing the pressing of the stick-type operation unit just before an intended position.

The overrun of the cursor can be prevented in the invention disclosed in Japanese Unexamined Patent Application Publication No. 10-21002, but it may not be possible to cope with the overrun of the cursor if hysteresis characteristics occur with respect to a load.

For example, after an operator separates one's finger from a stick during the operation in order to make a load become 0, the stick does not quickly return to an upright posture and slowly returns to the upright posture in general.

For this reason, even between when the finger is separated from the stick and when the stick reaches the upright posture, the load data does not completely become 0 and continues to be output while being decreased. If the load data output in this case acts as residual noise and is reflected in the movement of the cursor, there is a problem in that an operator cannot stop a cursor at an arbitrary point due to the residual noise, for example, when stopping the cursor at an arbitrary point on a screen, that is, it is not possible to perform an intended operation.

SUMMARY

According to an aspect of the disclosure, a coordinate input device includes an operation unit that is provided so as to be operated, strain sensors that output data corresponding to an operation amount of the operation unit, and a control unit. The control unit performs the count corresponding to the increase or decrease of speed data that is obtained by converting data sequentially output from the strain sensors, and generates counted count values or coordinate data calculated from the count values. The control unit calculates a moving average value from the count values that are sequentially output every predetermined time. When the moving average value satisfies predetermined conditions, the control unit regards that the operation of the operation unit is cancelled and stops the output of the coordinate data or outputs 0 as the count value.

According to the aspect of the invention, it is possible to prevent the influence of residual noise that is output after a finger is separated from the operation unit. Therefore, it is possible to provide a coordinate input device that has excellent operability.

DESCRIPTION OF EXEMPLARY EMBODIMENTS

Figure 1:
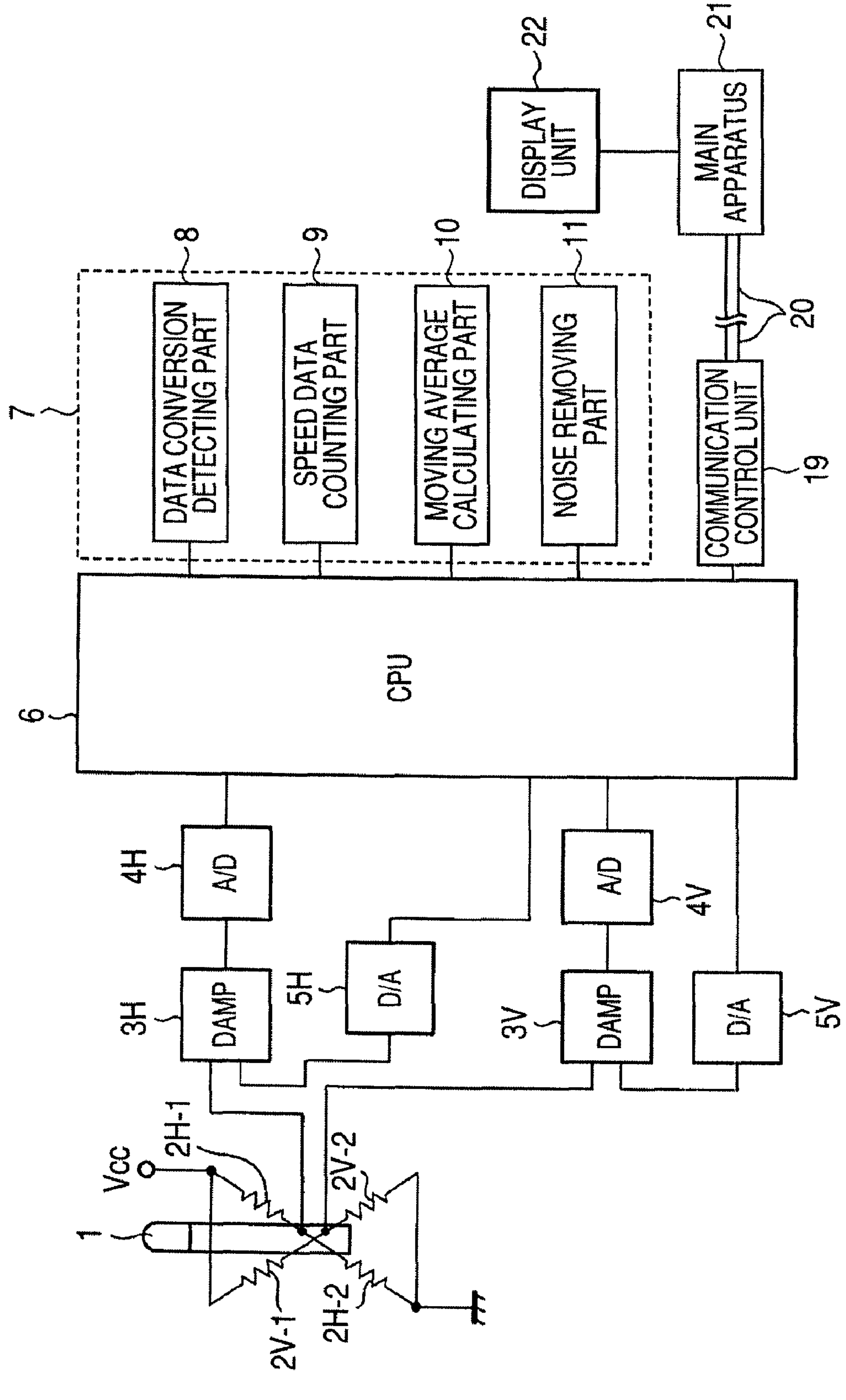
FIG. 1 is a block diagram of a stick-type coordinate input device according to an embodiment of the invention.

FIG. 1 is a block diagram of a coordinate input device according to an embodiment of the invention, and particularly, a block diagram of an example of a stick-type coordinate input device that has hysteresis characteristics with respect to a load.

As shown in FIG. 1, two transverse strain gauges (pressure detection sensors) 2H-1 and 2H-2 are attached to both sides of a base portion of a stick-type operation unit 1 in a transverse direction (X axis direction), and two longitudinal strain gauges (pressure detection sensors) 2V-1 and 2V-2 are attached to both sides of the base portion in a longitudinal direction (Y axis direction).

The two transverse strain gauges 2H-1 and 2H-2 are connected to each other in series between a power terminal Vcc and a ground point, and the two longitudinal strain gauges 2V-1 and 2V-2 are also connected to each other in series between the power terminal Vcc and the ground point.

When an end of the stick-type operation unit 1 is pressed by operator's fingertips, a head portion of the stick-type operation unit is swung about a base end thereof, so that the stick-type operation unit 1 is inclined as a whole. In this case, in the stick-type operation unit 1, resistance values of the transverse strain gauges 2H-1 and 2H-2 are changed relative to each other depending on the magnitude and polarity of a transverse component of a pressing force, and resistance values of the longitudinal strain gauges 2V-1 and 2V-2 are changed relative to each other depending on the magnitude and polarity of a longitudinal component of a pressing force.

One input of a transverse differential amplifier (DAMP) 3H is connected to a node between the two transverse strain gauges 2H-1 and 2H-2, and the other input thereof is connected to an output of a transverse analog-digital converter (D/A) 5H. One input of a longitudinal differential amplifier (DAMP) 3V is also connected to a node between the two longitudinal strain gauges 2V-1 and 2V-2, and the other thereof is connected to an output of a longitudinal analog-digital converter (D/A) 5V. An input of a transverse analog-digital converter (A/D) 4H is connected to an output of the transverse differential amplifier 3H, and an input of a longitudinal analog-digital converter (A/D) 4V is also connected to an output of the longitudinal differential amplifier 3V.

An input of the transverse analog-digital converter 5H is connected to a central control unit (CPU) 6, and the output thereof is connected to the other input of the transverse differential amplifier 3H. An input of the longitudinal analog-digital converter 5V is also connected to the central control unit (CPU) 6, and the output thereof is connected to the other input of the longitudinal differential amplifier 3V.

Further, a cursor movement control unit 7 is connected to the central control unit 6. The cursor movement control unit 7 includes a data conversion detecting part 8, a speed data counting part 9, a moving average calculating part 10, and a noise removing part 11. An input of a communication control unit 19 is connected to the central control unit 6. An output of the central control unit 6 is connected to an input of a main apparatus 21 such as a personal computer through a transmission cable 20, and a display unit 22 such as a display is connected to the main apparatus 21.

The operation of the coordinate input device according to this embodiment will be described herein. Meanwhile, in this embodiment, the operation performed by each of the transverse elements 2H-1, 2H-2, and 3H to 5H, is substantially the same as the operation performed by each of the longitudinal elements 2V-1, 2V-2, and 3V to 5V. Accordingly, in the following description of the operation, only the operation performed by each of the transverse elements 2H-1, 2H-2, and 3H to 5H will be described, and the description of the operation performed by each of the longitudinal elements 2V-1, 2V-2, and 3V to 5V will be omitted.

If an operator starts an operation of the stick-type operation unit 1, the resistance values of the transverse strain gauges 2H-1 and 2H-2 are changed relative to each other depending on the operation direction of the operation unit and the magnitude of a load force (operation amount) during the operation. A DC voltage, which represents the load force during the operation of the stick-type operation unit 1, is generated at the node between the transverse strain gauges 2H-1 and 2H-2 in accordance with the change of the resistance values. Then, the DC voltage is supplied to the transverse differential amplifier 3H as load data. The transverse differential amplifier 3H performs the differential amplification of the DC voltage and a correction value supplied from the transverse analog-digital converter 5H, and generates an analog output voltage corresponding to the difference therebetween. The transverse analog-digital converter 4H converts the analog output voltage of the transverse differential amplifier 3H into a digital voltage, and supplies the digital voltage to the central control unit 6 as digital load speed data.

After that, the central control unit 6 supplies the digital load data, which is output from the transverse analog-digital converter 4H, to the data conversion detecting part 8. The data conversion detecting part converts the supplied digital load data to digital speed data, and detects a changing state thereof. The data conversion detecting part 8 converts the load data to speed data through the time differentiation of the load data. That is, if a force is given from a relationship of F=ma ("F" indicates a force (load), "m" indicates mass, and "a" indicates acceleration), acceleration is obtained. The acceleration is converted to digital speed data by the time integration thereof. The digital speed data, which have been calculated herein, mean the values of X and Y moving distance vectors of relative moving distance data.

In addition, if the digital speed data has an ever-increasing tendency to be simply increased, the data conversion detecting part 8 generates a first detection output that represents simple increase and supplies the first detection output to the central control unit 6. Meanwhile, if the digital speed data has an ever-decreasing tendency to be simply decreased, the data conversion detecting part 8 generates a second detection output that represents simple decrease and supplies the second detection output to the central control unit 6.

If the output supplied from the data conversion detecting part 8 is the first detection output, the central control unit 6 sets the count state of the speed data counting part 9 to an increasing simple count state in response to the output. Meanwhile, if the output supplied from the data conversion detecting part 8 is the second detection output, the central control unit sets the count state of the speed data counting part 9 to a decreasing simple count state in response to the output.

Accordingly, the speed data counting part 9 performs the increase count or decrease count of the digital speed data that is supplied from the central control unit 6 every predetermined sampling time, generates an output count value that represents simple increase or simple decrease, and supplies the output count value to the central control unit 6.

After that, the central control unit 6 supplies the output count values, which are supplied from the speed data counting part 9, to the moving average calculating part 10 every predetermined sampling time. The moving average calculating part 10 calculates an average count value (moving average value) obtained by averaging the output count values, which are supplied from the speed data counting part 9 every predetermined sampling time, every predetermined sampling time. Then, the moving average calculating part supplies the average count value to the central control unit 6. Subsequently, the central control unit 6 supplies the average count value, which is supplied from the moving average calculating part 10, to the noise removing part 11. The noise removing part 11 supplies a removal count value, which is obtained after a predetermined noise removal process to be described below is performed, to the central control unit 6.

After that, the central control unit 6 transmits the removal count value, which is supplied from the noise removing part 11, to the main apparatus 21 such as a personal computer through the transmission cable 20. If the removal count value is supplied to the main apparatus, the main apparatus 21 processes the removal count value to generate coordinate data, which is suitable to be displayed, by using coordinate conversion software stored in OS; supplies the coordinate data to the display unit 22; and appropriately moves a cursor, which is displayed on the display unit 22, in the transverse direction in accordance with the contents of the coordinate data.

Meanwhile, the coordinate input device may be provided with a coordinate data generating part (not shown); may convert the removal count value to coordinate data, which is suitable to be displayed, by the coordinate data generating part; and may then supply the converted coordinate data to the main apparatus 21. That is, a step of converting the removal count value to coordinate data may be performed by firmware that is provided in the coordinate input device. Alternatively, only the removal count value may be sent to the main apparatus 21 such as a personal computer as described above, and a removal count value may be converted to coordinate data by software included in the main apparatus 21.

Next, the noise removal process will be described.

Figure 2:
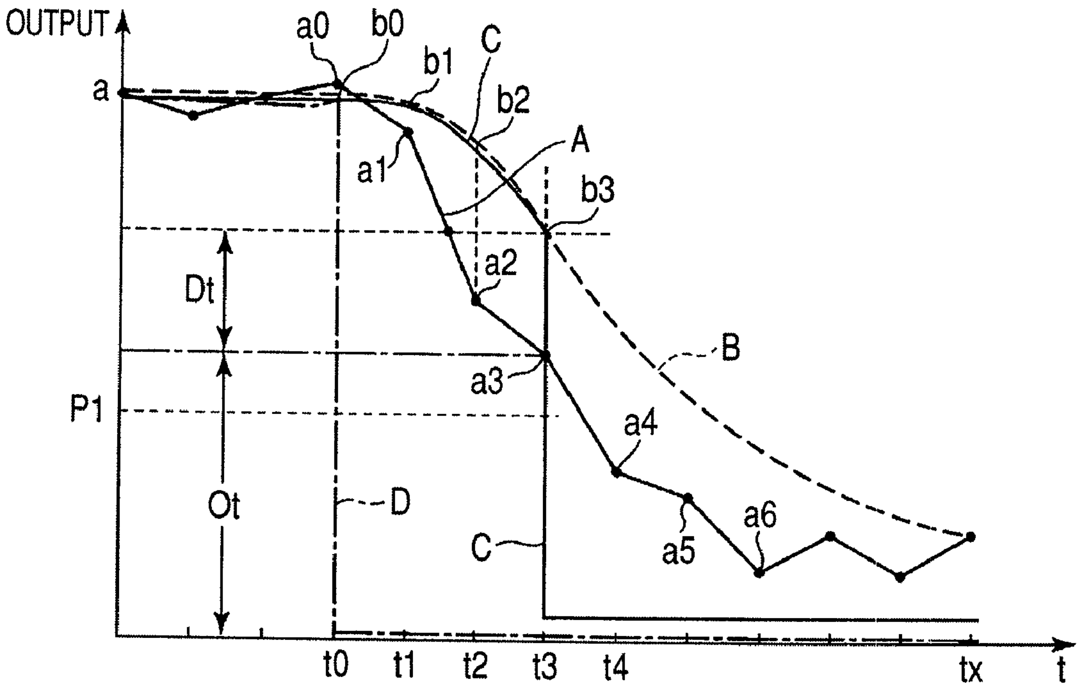
FIG. 2 is a characteristic diagram showing an example of a state where an output is changed with time during the operation of a stick-type operation unit 1.

FIG. 2 is a characteristic diagram showing an example of a state where an output is changed with time during the operation of the stick-type operation unit 1. In FIG. 2, a broken line A represents a count value that is supplied from the speed data counting part 9 (hereinafter, referred to as a raw count line A), a dotted line B represents an average count value that is supplied from the moving average calculating part 10 (hereinafter, referred to as an average count line B), and a solid line C represents an average count value (removal count value) which is output from the noise removing part 11 and from which noise has been removed (hereinafter, referred to as a removal count line C). Meanwhile, a dashed dotted line D represents a count value when an ideal stick-type operation unit 1 is ideally operated.

In an ideal case, that is, when an operator separates one's finger from the stick-type operation unit at a time $t_0$ while the stick-type operation unit 1 is inclined in a certain direction, the stick-type operation unit 1 quickly returns to an upright posture. When the output of the speed data counting part 9 becomes 0, the characteristic of the count value output from the speed data counting part 9 is represented by the dashed dotted line D.

However, when the finger is actually separated from the stick-type operation unit 1, the stick-type operation unit 1 does not quickly return to the upright posture and slowly returns to the upright posture with taking time. Accordingly, the actual output of the speed data counting part 9 has a zigzag characteristic as shown by the raw count line A. In this case, between the time $t_0$ when the finger is separated and a time tx when the stick-type operation unit 1 reaches the upright posture, a decrease count value, which is gradually decreased, is output from the speed data counting part 9.

In this case, when a count value of the raw count line A becomes a predetermined threshold value or less, a method of making the output count value of the coordinate input device be 0 is considered.

However, residual noise is included in the digital load data that is supplied from the analog-digital converter 4H. Accordingly, the raw count line A, which is obtained from the digital speed data and the digital speed data converted from the digital load data, is also affected by the residual noise.

For this reason, when whether a signal exists is to be determined on the basis of the threshold value, the determination of every raw count value A is reversed in the vicinity of the threshold value due to the influence of the noise. Accordingly, it is likely that it is difficult to obtain a stable output.

In the invention, the moving average calculating part 10 calculates an average count value (several tens to several hundreds msec), which is a simple moving average corresponding to N times (N is a natural number equal to or larger than 2), from the decrease count value, which is output from the speed data counting part 9 every predetermined sampling time (for example, several to several tens msec).

For example, as shown in FIG. 2, count values, which are supplied from the speed data counting part 9 at successive times $t_0$, $t_1$, $t_2$, $t_3$ . . . , $t_N$, are referred to as $a_0$, $a_1$, $a_2$, $a_3$, . . . , $a_N$, respectively. The moving average calculating part 10 calculates an average count value $AC(t_N)$ at a time $t_N$ from the count values $a_0$, $a_1$, $a_2$, $a_3$, . . . $a_N$ by the following expression 1 (expression using a simple moving average value SMA) every predetermined sampling period. Meanwhile, N indicates the number of count values to be averaged, and is a natural number that is equal to or larger than 2.

$$SMA(t_N)=(a_0+a_1+a_2+\ldots+a_{N-1})/N \qquad \text{(Expression 1)}$$

As shown in Expression 2, a new count value $a_N$ is added and the oldest count value $a_0$ is removed in order to obtain a simple moving average SMA ($t_{N+1}$) corresponding to the next time $t_{N+1}$.

$$SMA(t_{N+1})=(a_1+a_2+a_3+\ldots+a_N)/N \qquad \text{(Expression 2)}$$

As shown in FIG. 2, the average count line B, which is obtained by representing the average count values obtained from Expressions 1 and 2 in the form of a chart, has time delay as compared to the raw count line A that is obtained by representing the count value in the form of a chart. However, the smoothness of the average count line is more excellent than that of the raw count line A as a whole. For this reason, if the average count line B is used as reference, it is possible to obtain a stable output with reducing the influence of the residual noise and to improve operability.

Next, a method of effectively removing noise by the average count value B will be described.

A method of removing noise will be performed by the firmware of the coordinate input device in the following description. However, the invention is not limited thereto, and the method of removing noise may be performed by software stored in OS of the main apparatus 21 that receives data.

The central control unit 6 monitors whether the average count line satisfies the following two conditions.

Herein, a first condition is as follows: a current count value Ot (Ot=a3 in FIG. 2), which is output from the speed data counting part 9 and is on the raw count line A, is larger than a first reference count value P1 corresponding to the minimum speed.

The minimum speed, which is the first reference count value P1, means a count value corresponding to the minimum value of speed that is generated in the stick-type operation unit 1 when the stick-type operation unit 1 is inclined by the minimum load required to operate the stick-type operation unit 1.

A second condition is as follows: when a count value (for example, b3), which is output from the moving average calculating part 10 and is on the average count line B, is compared with a current count value (for example, a3), which is output from the speed data counting part 9 and is on the raw count line A, the difference Dt (=b3−a3) between the count values exceeds a predetermined second reference count value P2.

If the first condition is satisfied, that is, if the current count value Ot is larger than the first reference count value P1 (minimum speed) (Ot>P1), the noise removing part 11 grasps that the stick-type operation unit 1 is not in the upright posture or a posture close to the upright posture and is returning to the upright posture from a posture significantly inclined to a certain direction. Meanwhile, if the current count value Ot is smaller than 0 (Ot<0), the noise removing part grasps that the stick-type operation unit is being inclined to a certain direction from the upright posture.

Further, if the second condition is satisfied, that is, if the difference Dt exceeds the second reference count value P2 (Dt>P2), the noise removing part 11 grasps that an operator makes a force (load) applied to the stick-type operation unit 1 be 0 because the current count value is significantly different from the moving average value that is the count value on the average count line B.

The value of the difference Dt may be a value different from the count value (for example, b3) that is output from the moving average calculating part 10 and is on the average count line B.

Accordingly, if the first and second conditions are satisfied, the noise removing part 11 regards that an operator separates one's finger from the stick-type operation unit 1, sets the removal count value output from the noise removing part 11 to 0 or a value that is regarded as about 0 such as about 1/100 times of the average count value, and supplies the removal count value to the central control unit 6 as described above.

Further, a removal count value of about 0 is transmitted from the central control unit 6 to the main apparatus 21 such as a personal computer through the communication control unit 19 and the transmission cable 20.

Alternatively, when the coordinate data is output from the coordinate input device to the main apparatus 21, the output of the coordinate data to be transmitted to the main apparatus 21 such as a personal computer is stopped.

Even when load data continues to be output from the transverse analog-digital converter (ND) 4H between when an operator separates one's finger from the stick and when the stick reaches the upright posture as described above, a removal count value of about 0, which is hardly affected by the influence of the residual noise, is supplied to the main apparatus 21 or the supply of the coordinate data is stopped, so that it is possible to prevent unstable load data, which is based on the residual noise, from being reflected in the movement of a cursor. Accordingly, an operator can perform an intended operation. For example, it is possible to stop a cursor at an arbitrary point on a screen, that is, to improve operability.

Meanwhile, the coordinate input device composed of a stick-type operation body has been described in the above-mentioned embodiment. However, as long as an operation body has hysteresis characteristics with respect to a load, the coordinate input device may be composed of any operation body.

It should be understood by those skilled in the art that various modifications, combinations, sub-combinations and alterations may occur depending on design requirements and other factors insofar as they are within the scope of the appended claims of the equivalents thereof.

What is claimed is:

1. A coordinate input device comprising:

an operation unit that is provided so as to be operated;

strain sensors that output data corresponding to an operation amount of the operation unit; and a control unit that performs the count corresponding to the increase or decrease of speed data, which is obtained by converting data sequentially output from the strain sensors, and generates counted count values or coordinate data calculated from the count values, wherein the control unit calculates a moving average value from the count values that are sequentially output every predetermined time, when the moving average value satisfies predetermined conditions, the control unit regards that the operation of the operation unit is cancelled, and stops the output of the coordinate data or outputs 0 as the count value, and wherein the control unit includes a data conversion detecting part that converts load data supplied from the strain sensors to speed data and detects a changing state thereof, a speed data counting part that generates count values corresponding to the increase or decrease of the speed data every predetermined sampling time, a moving average calculating part that calculates a moving average every sampling time of the count values, and a noise removing part that performs a predetermined noise removal process on the count values supplied from the moving average calculating part.

2. The coordinate input device according to claim 1, wherein the predetermined conditions are as follows:

(1) a current count value output from the speed data counting part is larger than a first reference count value corresponding to a predetermined minimum speed; and (2) difference between the count value output from the moving average calculating part and the current count value output from the speed data counting part exceed a predetermined second reference count value.

* * * * *